(12) United States Patent
Saran et al.

(10) Patent No.: US 10,311,397 B1
(45) Date of Patent: Jun. 4, 2019

(54) AUTOMATIC DISCOVERY OF ENDPOINT DEVICES

(71) Applicant: Amazon Technologies, Inc., Seattle, WA (US)

(72) Inventors: Sajesh Kumar Saran, Bothell, WA (US); Nicholas Michael Vallidis, Seattle, WA (US); Tyler Ogren Vrooman, Seattle, WA (US); Jared Justin Huntington, Seattle, WA (US); James Merton Tidman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/697,393

(22) Filed: Apr. 27, 2015

(51) Int. Cl.
| | |
|---|---|
| *G06F 11/30* | (2006.01) |
| *G06F 1/32* | (2006.01) |
| *G06Q 10/08* | (2012.01) |
| *G06F 1/26* | (2006.01) |
| *G06F 1/3206* | (2019.01) |

(52) U.S. Cl.
CPC ............ *G06Q 10/087* (2013.01); *G06F 1/26* (2013.01); *G06F 1/3206* (2013.01); *G06F 11/3058* (2013.01)

(58) Field of Classification Search
CPC .......................... G06F 1/3206; G06F 11/3058
USPC ................................................ 713/300, 310
See application file for complete search history.

(56) References Cited

U.S. PATENT DOCUMENTS

| | | | | |
|---|---|---|---|---|
| 7,657,763 | B2* | 2/2010 | Nelson ................ | H02J 13/0013 323/234 |
| 7,844,839 | B2* | 11/2010 | Palmer ................ | H04L 67/1008 709/201 |
| 8,225,124 | B2* | 7/2012 | Geiger .................... | H04L 12/10 713/320 |
| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 2007/0240017 | A1* | 10/2007 | Takahashi ........... | G06F 11/2015 714/14 |
| 2009/0016249 | A1* | 1/2009 | Li ......................... | H04J 3/0638 370/310.1 |
| 2010/0090542 | A1* | 4/2010 | Johnson ................... | H02G 3/00 307/125 |
| 2013/0284806 | A1 | 10/2013 | Margalit | |

* cited by examiner

*Primary Examiner* — Michael J Brown
(74) *Attorney, Agent, or Firm* — Lee & Hayes, P.C.

(57) ABSTRACT

This disclosure describes techniques for automatically identifying endpoint devices based on differing power loads drawn by the endpoint devices. In some instances, the endpoint devices are distributed about one or more facilities, such as item handling facilities, and may comprise an array of sensors for tracking inventory items within, into, and out of these facilities. These sensors may include cameras, weight sensors, RFID readers, microphones, and the like. Further, multiple ones of these sensors may couple to a power injector (e.g., a power-over-Ethernet (POE) injector) that provides both data and power to each sensor over a cable. The power injector may in turn couple to a network switch and/or a controller, which may identify the endpoint devices based on their modulated power loads.

20 Claims, 6 Drawing Sheets

AUTOMATIC DISCOVERY OF ENDPOINT DEVICES

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer-accessible areas (e.g., shopping area) and customers can locate items from within the store, pick the items from inventory and take them to a cashier for purchase, rental, etc.

It is often desirable to track inventory items at their location. Some fulfillment centers and/or physical stores may utilize cameras, barcode readers, radio frequency identifier tags, etc., to track inventory within the facility. However, tracking inventory items in this manner may require a great deal of infrastructure in the form of different types of sensors and computing devices. Maintaining an accurate mapping of the interconnection of these computing devices may prove burdensome if performed manually.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
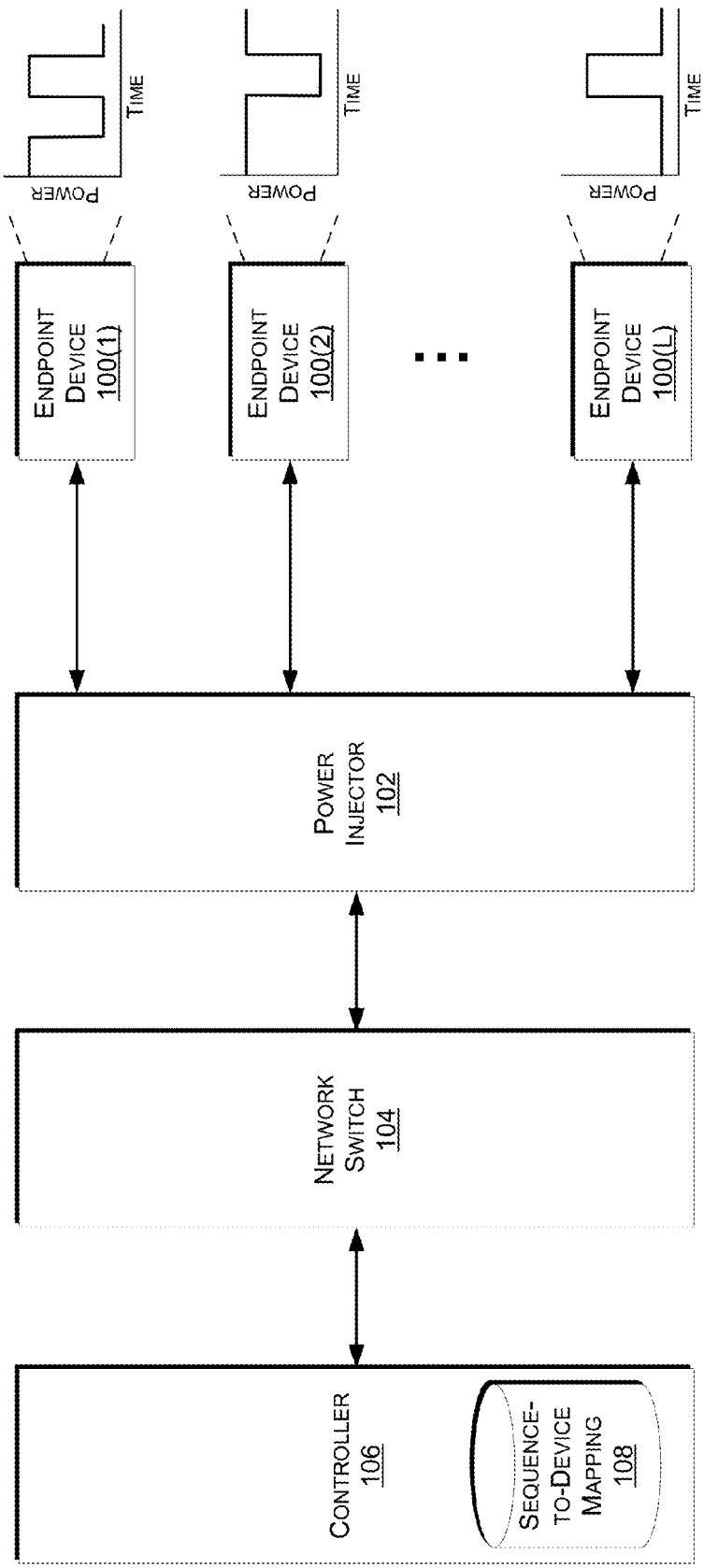
FIG. 1 shows an example interconnection between endpoint devices, a power injector, a network switch, and a controller, which may automatically identify the endpoint devices based on differing modulating loads drawn by these endpoint devices.

This disclosure describes techniques for automatically identifying endpoint devices based on differing power loads drawn by the endpoint devices. In some instances, the endpoint devices are distributed about one or more facilities, such as item handling facilities, and may comprise an array of sensors for tracking inventory items within, into, and out of these facilities. These sensors may include cameras, weight sensors, RFID readers, microphones, and the like. Further, multiple ones of these sensors may couple to a power source (e.g., a power-over-Ethernet (POE) injector) that provides both data and power to each sensor over a cable. The power source may in turn couple to a network switch and/or a controller.

In some instances, the controller functions to identify the endpoint devices, such as the sensors or other computing devices, coupled to the power source, such as the power injector. For instance, the controller may identify which endpoint devices couple to which ports of a POE power injector. Based on the identification, the controller or other apparatus is able to issue instructions to the respective endpoint devices as needed, such as when a particular endpoint device needs to be power cycled, reset, turned off, or the like.

To identify the endpoint devices, each device may modulate its load drawn from the power injector according to a predefined sequence. For instance, a first endpoint device coupled to the power injector may modulate its load according to a first sequence, a second endpoint device coupled to the power injector may modulate its load according to a second sequence, and so forth. The controller may receive an indication of these different modulated loads and may map each modulation to a respective identity. The controller may then store an indication of the identity of each endpoint device and on which port of the power injector the device couples to. In some instances, the controller may issue instructions to the endpoint devices to modulate their loads, while in other instances the endpoint devices may be configured to do so upon boot-up of the devices, periodically, or in any other manner. In some instances, each endpoint device may modulate its load to indicate an identifier of the device (e.g., via Morse code, a binary scheme, a non-binary scheme, etc.), such as a MAC address, IP address, or other asset identifier of the respective endpoint device. Again, the controller may map this identifier to the endpoint device and may store an indication of this identification.

The endpoint devices may module their load for the purpose of identifying themselves in any number of ways. In some instances, each respective endpoint device may include a switch that, when toggled off, lowers or stops the power drawn by the endpoint device from the power injector and that when toggled on, increases the power draw by the endpoint device. In another example, the endpoint device may turn on or off one or more lights or peripheral devices for the purpose of altering the power drawn from the power injector. Of course, while a few examples are listed, it is to be appreciated that the endpoint devices may modulate their loads in other manners.

Regardless of how the endpoint devices modulates their load, the controller may identify each endpoint device coupled to a power injector by mapping how the respective endpoint device modulates the load to a predefined mapping of devices. Therefore, the endpoint devices may be auto-identified, even in cases where a power injector resides midspan between the network switch and the endpoint devices. Once the endpoint devices have been identified, they may be more effectively managed from a central location. For instance, endpoint devices at known locations in the network infrastructure may be remotely power-cycled, turned off, turned on, and the like. This, in turn, may increase the efficacy of the infrastructure for tracking inventory items within, into, and out of a materials handling facility.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

FIG. 1 shows an example interconnection between endpoint devices 100(1), 100(2), . . . , 100(L), a power injector 102, a network switch 104, and a controller 106, which may automatically identify the endpoint devices based on differing modulating loads drawn at these endpoint devices 100. As described in detail below, the endpoint devices 100 may comprise an array of sensors and/or other computing devices distributed through a facility, such as the materials handling facilities described in detail below. In some instances, the interconnection between the power injector 102 and the endpoint devices may comply with the IEEE 802.3af specification (and/or other pertinent specifications), also known as Data Terminal Equipment (DTE) Power via Media Dependent Interface (MDI). As such, a Medium-Dependent Interface (e.g., MDI, RJ-45, etc.) may serve as the data and power interface between the power injector 102 and the endpoint devices 100. As IEEE 8-2.3af defines, at least two optional connection methods may be utilized to carry power to the endpoint devices 100.

In some instances, one or more endpoint devices 100 may couple to a common network switch (such as switch 104), with a "midspan" device residing between the network switch 104 and the endpoint devices 100. The midspan device may comprise the power injector 102 configured to pass power (i.e., current, electrical energy, etc.) and potentially data to the endpoint devices 100. In some instances, the power injector 102 comprises a power-over-Ethernet (POE) device that passes both power and data to respective endpoint devices over respective cables. That is, a first cable coupling the power injector 102 to a first endpoint device 100(1) may provide power and data to the first device 100(1), a second cable coupling the power injector 102 to a second endpoint device 100(2) may provide both power and data to the second device 100(2), and so forth. Of course, in other implementations the power injector may utilize multiple cables for providing data and/or power to each respective endpoint device.

In some instances, the insertion of the power injector 102 between the network switch 104 and the endpoint devices 100 results in the network switch 104 and/or the controller 106 being unaware of locations of the endpoint devices within the facility. That is, the switch 104 and/or the controller 106 may be unaware as to which endpoint devices couple to which ports of the power injector 102. Therefore, each the endpoint devices may be configured to modulate an amount of power drawn from the power injector 102 for use in identifying each respective endpoint device.

FIG. 1, for instance, illustrates that the first endpoint device 100(1) may be configured to modulate the load drawn from the power injector 102 according to the first sequence "on, off, on, off" (or "high, low, high, low"). The network switch 104 and/or the controller 106 may receive an indication that a device located on a first port of the power injector is varying its load according to this first sequence. That is, the controller 106 may identify that that the current drawn by the endpoint device is in fact the "on, off, on, off" sequence. The switch 104 and/or the controller 106 may then map this sequence to the first endpoint device to identify the first endpoint device. That is, the controller 106, for instance, may have access to a sequence-to-device mapping 108 that indicates which load-modulation sequences are associated with which respective endpoint devices. Upon receiving an indication that an endpoint device coupled to a first port of the power injector 102 has modulated its load according to the first sequence, the controller 106 may identify, from the data store 108, what endpoint device is associated with the first sequence. In this example, the controller 106 may determine that the endpoint device 100(1) (e.g., a particular camera, weight sensor, etc.) is associated with that sequence and, hence, may store an indication that the endpoint device 100(1) is coupled to the first port of the power injector 102. Having identified the endpoint device 100(1) and having stored which port on the power injector 102 the device couples to, the controller 106 may now communicate with the endpoint device for performing needed operations, such as sending an instruction to the endpoint device 100(1) to power cycle itself if the controller 106 determines that the endpoint device 100(1) becomes frozen or locked up, for instance, Similar to the above, the second endpoint device 100(2) may be configured to modulate its load according to a predefined sequence, although the device 100(2) may modulate its load according to a second sequence that is unique relative to other sequences of the endpoint devices. As illustrated, the second sequence may comprise the pattern "on, on, off, on, on, off" (or "high, high, low, high, high, low"). Again, the controller 106 may receive an indication of an endpoint device located on the second port of the power injector 102 performing this sequence and may map this sequence to the second endpoint device 100(2). The controller 106 may then store an indication that the identified device 100(2) is located at the second port of the power injector 102 and, again, the controller may now be able to send instructions as needed to the second endpoint device 100(2).

Furthermore, a third endpoint device 100(L) may be configured to modulate its load according to a third sequence that is unique relative to the first and second sequences. In this example, the endpoint device 100(L) is configured to modulate its load according to the sequence "off, off, on, off, off, on" (or "low, low, high, low, low, high"). Again, the controller 106 may receive an indication that an endpoint device operating on the third port of the power injector 102 is modulating its load according to the third sequence, may map this sequence to the third device 100(L), and may store an indication that the third device 100(L) is located at the third port of the power injector 102. The controller 106 may now be able to send communicate with the third endpoint device 100(L) as needed.

While the above examples describe example sequences utilized by the endpoint devices 100, in some instances an endpoint device 100 is configured to encode its own identifier via the load-modulation techniques. For instance, an endpoint device 100 may be configured to encode (e.g., via Morse code, binary, etc.) its MAC address, IP address, asset ID, or other unique identifier. Likewise, the controller 106 may be configured to decode the power-modulation sequence to determine the identifier and map the identifier to the particular endpoint device.

In some instances, the techniques for identifying the endpoint devices by modulating the current drawn by the devices may be performed without interrupting operation of the devices themselves. For instance, each device may modulate the amount of current drawn (e.g., by turning on or off peripheral devices, opening or closing switches, etc.) while still performing the functionality of the respective endpoint device. For instance, a video camera may continue to record while modulating its current draw.

Further, in some instances the controller 106 may be configured to instruct one or more of the endpoint devices 100 to send perform their load-modulation techniques for the purpose of identifying the endpoint devices. For instance, the controller 106 may be configured to request that the endpoint devices 100 coupled to the power injector 102 sequentially perform their load-modulation sequences to allow the controller 106 to identify each endpoint device coupled thereto. Conversely, the controller 106 may be configured to send instructions requesting identification of a single endpoint device. For instance, the controller 106 may send an instruction requesting that the second endpoint device 100(2) perform its load-modulation sequence. Upon each of the three example endpoint devices 100 receiving this instruction, only the second endpoint device 100(2) may respond, and it may respond by performing its sequence. The controller 106 may identify, based on this sequence, that the second endpoint device 100(2) couples to the second port of the power injector.

In still other instances, the endpoint devices 100 may be configured to perform their load-modulation sequences periodically, upon boot-up, or in any other manner. For instance, each device 100 may be configured to perform its sequencing operation as part of a start-up process of the respective device. Each device may continue to perform its load modulation sequence until receiving confirmation from the controller 106 that the controller 106 has identified the respective device.

The endpoint devices 100 may modulate the power drawn from the power injector 102 for the purpose of performing their unique sequences in any manner. For instance, in one example each endpoint device includes a resistor and a switch (e.g., a MOSFET switch) that the device may toggle between an open state and a closed state. When the switch resides in the closed state, the endpoint device may receive power from the power injector 102, while in the open state the endpoint device will not. As such, a particular endpoint device may toggle its switch according to the device's load-modulation sequence in order to modulate the load drawn from the power injector 102 according to the device's sequence. In other instances, an endpoint device may turn its processor off or on, turn its peripheral devices off or on, alter settings of the device, or the like for increasing or decreasing the power drawn by the device from the power injector 102 according to the load-modulation sequence of the device.

Figure 2:
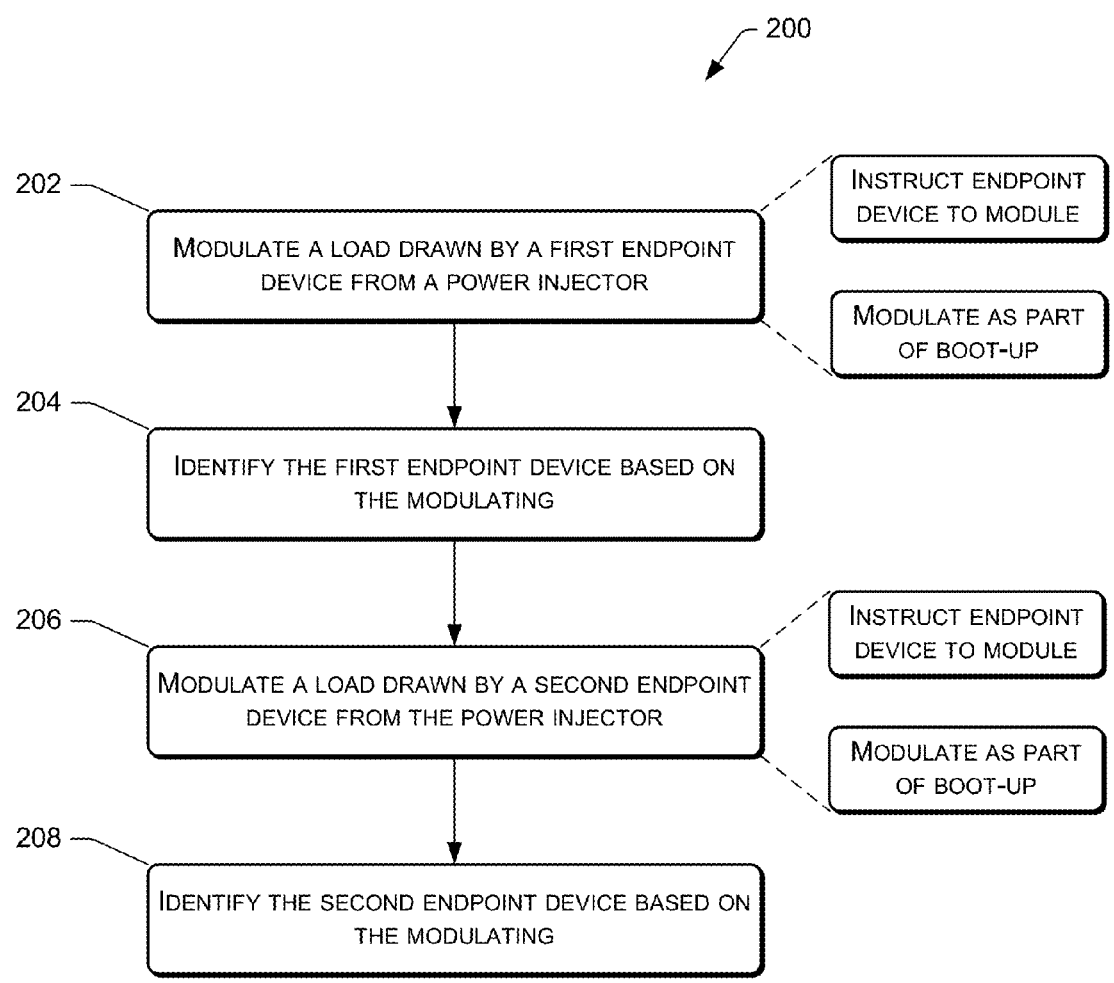
FIG. 2 is a flow diagram of an example process for modulating loads at endpoint devices for the purpose of identifying the endpoint devices.

FIG. 2 is a flow diagram of an example process 200 for modulating loads at endpoint devices for the purpose of identifying the endpoint devices. The example process 200, and any other processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The process 200 includes, at operation 202, modulating an amount of current ("load") drawn by a first endpoint device from a power injector according to a first sequence. As described above, the first endpoint device may modulate its load in a way that encodes an identifier of the first endpoint device, such as a MAC address, IP address, serial number, asset ID, or the like. Further, the first endpoint device may toggle a switch between an open and closed state, may turn on and off peripheral devices, or may modulate the power draw in any other way. As shown to the right of the operation 202, the first endpoint device may perform the load-modulation sequence in response to receiving an instruction to do so, as part of a boot-up process of the endpoint device, or in response to any other trigger.

At an operation 204, the process 200 identifies the first endpoint device based on the first load-modulation sequence. For instance, the process 200 may decode the identified sequence to determine the identifier of the first endpoint device. The process 200 may then store an indication of a port on a power injector to which the first endpoint device couples, such that the first endpoint device is now addressable.

At an operation 206, the process 200 modulates an amount of current ("load") drawn by a second endpoint device from a power injector according to a second sequence. As described above, the second endpoint device may modulate its load in a way that encodes an identifier of the second endpoint device, such as a MAC address, IP address, serial number, asset ID, or the like. Further, the second endpoint device may toggle a switch between an open and closed state, may turn on and off peripheral devices, or may modulate the power draw in any other way. As shown to the right of the operation 206, the second endpoint device may perform the load-modulation sequence in response to receiving an instruction to do so, as part of a boot-up process of the endpoint device, or in response to any other trigger.

Figure 5:
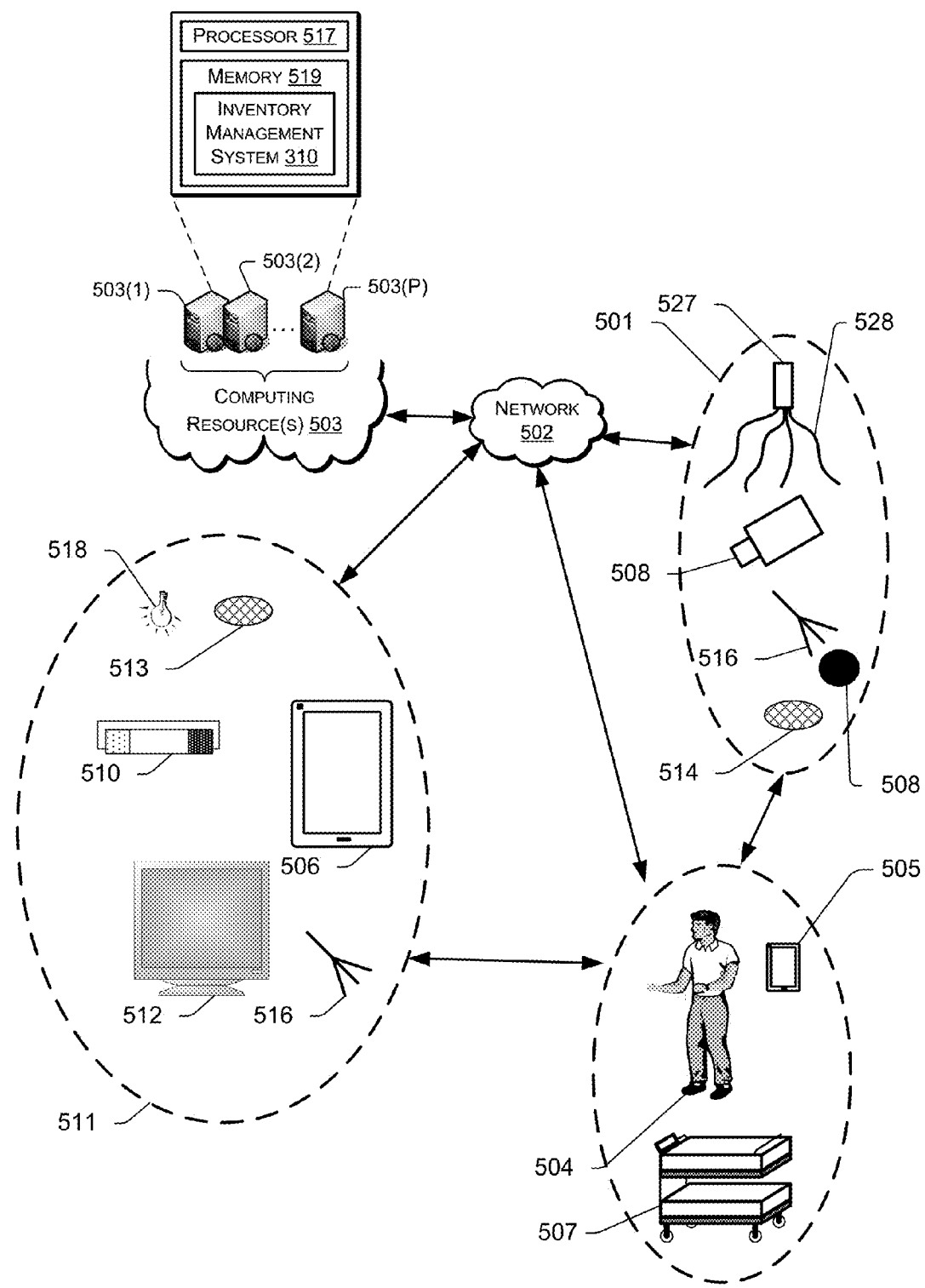
FIG. 5 shows endpoint devices and communication paths between the endpoint devices utilized in the materials handling facility of FIG. 3.

At an operation 208, the process 200 identifies the second endpoint device based on the second load-modulation sequence. For instance, the process 200 may decode the identified sequence to determine the identifier of the second endpoint device. The process 200 may then store an indication of a port on a power injector to which the second endpoint device couples, such that the second endpoint device is now addressable. While FIG. 5 illustrates identifying two endpoint devices according to unique load-modulation sequences, it is to be appreciated that the techniques may be utilized to identify any other number of endpoint devices.

Figure 3:
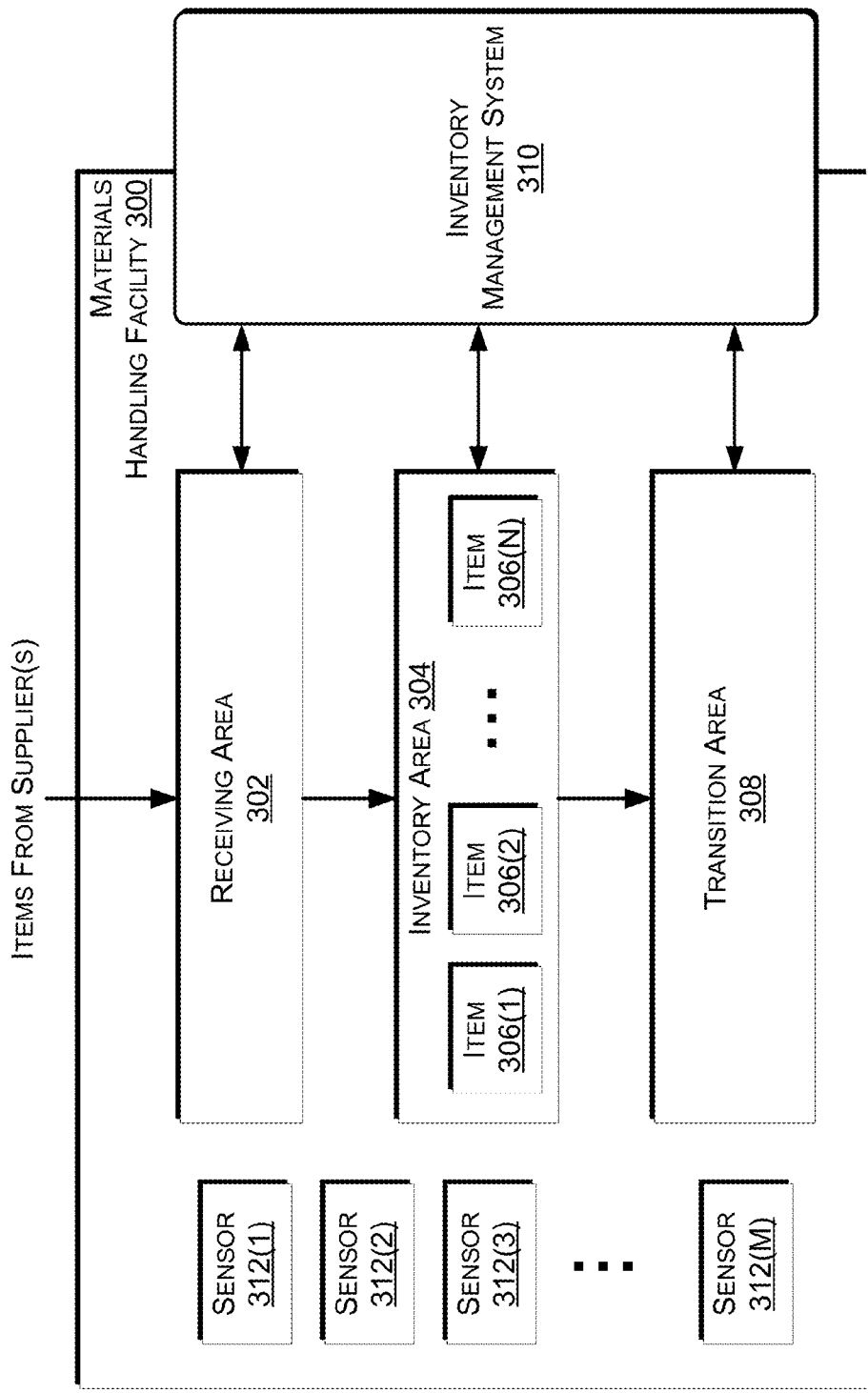
FIG. 3 is a block diagram illustrating a materials handling facility, including an array of sensors for tracking inventory items at the material handling facility.

An implementation of a materials handling facility configured to store and manage inventory items is illustrated in FIG. 3. As shown, a materials handling facility 300 includes a receiving area 302, an inventory area 304 configured to store an arbitrary number of inventory items 306(1)-306(N), and one or more transition areas 308. The arrangement of the various areas within materials handling facility 300 is depicted functionally rather than schematically. For example, in some implementations, multiple different receiving areas 302, inventory areas 304 and transition areas 308 may be interspersed rather than segregated. Additionally, the materials handling facility 300 includes an inventory management system 310 configured to interact with each of receiving area 302, inventory area 304, transition area 308 and/or users within the materials handling facility 300.

The materials handling facility 300 may be configured to receive different kinds of inventory items 306 from various suppliers and to store them until a user orders or retrieves one or more of the items. The general flow of items through materials handling facility 300 is indicated using arrows. Specifically, as illustrated in this example, items 306 may be received from one or more suppliers, such as manufacturers, distributors, wholesalers, etc., at receiving area 302. In various implementations, items 306 may include merchandise, commodities, perishables, or any suitable type of item depending on the nature of the enterprise that operates the materials handling facility 300.

Upon being received from a supplier at receiving area 302, items 306 may be prepared for storage. For example, in some implementations, items 306 may be unpacked or otherwise rearranged, and the inventory management system 310 (which, as described below, may include hardware and/or one or more software applications executing on a computer system) may be updated to reflect the type, quantity, condition, cost, location or any other suitable parameters with respect to newly received items 306. It is noted that items 306 may be stocked, managed or dispensed in terms of countable, individual units or multiples of units, such as packages, cartons, crates, pallets or other suitable aggregations. Alternatively, some items 306, such as bulk products, commodities, etc., may be stored in continuous or arbitrarily divisible amounts that may not be inherently organized into countable units. Such items 306 may be managed in terms of measurable quantities such as units of length, area, volume, weight, time duration or other dimensional properties characterized by units of measurement. Generally speaking, a quantity of an item 306 may refer to either a countable number of individual or aggregate units of an item 306 or a measurable amount of an item 306, as appropriate.

After arriving through receiving area 302, items 306 may be stored within inventory area 304 on an inventory shelf. In some implementations, like items 306 may be stored or displayed together in bins, on shelves or via other suitable storage mechanisms, such that all items 306 of a given kind are stored in one location. In other implementations, like items 306 may be stored in different locations. For example, to optimize retrieval of certain items 306 having high turnover or velocity within a large physical facility, those items 306 may be stored in several different locations to reduce congestion that might occur at a single point of storage.

When a user order specifying one or more items 306 is received, or as a user progresses through the materials handling facility 300, the corresponding items 306 may be selected or "picked" from inventory area 304. For example, in one implementation, a user may have a list of items to pick and may progress through the materials handling facility picking items 306 from the inventory area 304. In other implementations, materials handling facility employees (referred to herein as users) may pick items 306 using written or electronic pick lists derived from orders. In some instances, an item may need to be repositioned from one location within the inventory area 304 to another location. For example, in some instances, an item may be picked from its inventory area, moved a distance and placed at another location.

In some instances, the items 306 may tracked using one or more sensors 312(1), 312(2), 312(3), . . . , 312(M) as they move within, into, and out of the materials handling facility 300, as described in further detail with reference to FIGS. 2 and 3. The sensors 312 may be arranged at one or more locations within the facility 300. For example, the sensors 312 may be mounted on or within a floor, wall, or ceiling, at an inventory location, on a tote for carrying items (e.g., a shopping cart), may be carried or worn by users, and so forth.

The sensors 312 may include one or more cameras configured to acquire images of the facility 300. A camera is configured to detect light in one or more wavelengths including, but not limited to, terahertz, infrared, visible, ultraviolet, and so forth. The inventory management system 310 may use image data acquired by the cameras during operation of the facility 300. For example, the inventory management system 310 may identify items, users, totes, and so forth, based at least in part on their appearance within the image data.

The sensors 312 may also include one or more 3D sensors, which are configured to acquire spatial or three-dimensional data, such as depth information. The 3D sensors may include range cameras, lidar systems, sonar systems, radar systems, structured light systems, stereo vision systems, optical interferometry systems, coded aperture systems, and so forth. The inventory management system 310 may use the three-dimensional data acquired to identify objects and/or to determine one or more of a location, orientation, or position of an object.

The sensors 312 may also include one or more buttons configured to accept input from a user within the facility 300. The buttons may comprise mechanical, capacitive, optical, or other mechanisms. For example, the buttons may comprise mechanical switches configured to accept an applied force from a touch of the user to generate an input signal. The inventory management system 310 may use data from the buttons to receive information from the user, such as a username and password associated with an account of the user.

The sensors 312 may also include one or more touch sensors that use resistive, capacitive, surface capacitance, projected capacitance, mutual capacitance, optical, Interpolating Force-Sensitive Resistance (IFSR), or other mechanisms to determine the point of a touch or near-touch. The inventory management system 310 may use data from the touch sensors to receive information from a user within the facility. For example, a touch sensor may be integrated with a tote of the user (e.g., a shopping cart) to provide a touchscreen with which the user may select from a menu one or more particular items 306 for picking.

The sensors 312 may further include one or more microphones configured to acquire audio data indicative of sound present in the environment. The sound may include user speech uttered by users within the environment and/or other sound. In some implementations, arrays of microphones may be used. These arrays may implement beamforming or other techniques to provide for directionality of gain. The inventory management system 310 may use the one or more microphones to accept voice input from users, determine the location of one or more users in the facility 300, and so forth.

In still other instances, the sensors 312 may include one or more weight sensors configured to measure the weight of a load, such as an item, a user, a tote, and so forth. The weight sensors may be configured to measure the weight of the load at one or more of the inventory areas, in a tote, or on the floor of the facility 300. The weight sensors may include one or more sensing mechanisms to determine weight of a load, such as piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 310 may use the data acquired by the weight sensors to identify an object, determine a location of an object, maintain shipping records, and so forth. For example, the weight sensors at a particular location in the facility 300 may report a weight of the user, indicating the user is present at that location.

The sensors 312 may further include one or more light sensors configured to provide information associated with ambient lighting conditions, such as a level of illumination. Information acquired by the light sensors may be used by the inventory management system 310 to adjust a level, intensity, or configuration of the lighting devices in the facility 300.

The sensors 312 may also include one more radio frequency identification (RFID) readers, near field communication (NFC) systems, and so forth. The RFID readers may be configured to read the RF tags coupled to items 306. Information acquired by the RFID reader may be used by the inventory management system 310 to identify an object associated with an RF tag, such as an item, a user, a tote, and so forth. In still other instances, the sensors 312 may comprise one or more RF receivers. In some implementations, the RF receivers may be part of transceiver assemblies. The RF receivers may be configured to acquire RF signals associated with Wi-Fi™, Bluetooth®, ZigBee®, 3G, 4G, LTE, or other wireless data transmission technologies. The RF receivers may provide information associated with data transmitted via radio frequencies, signal strength of RF signals, and so forth. For example, information from the RF receivers may be used by the inventory management system 310 to determine a location of an RF source such as a device carried by a user in the facility 300.

The sensors 312 may include one or more accelerometers, which may be worn or carried by a user, mounted to a tote, and so forth. The accelerometers may provide information such as the direction and magnitude of an imposed acceleration. Data such as rate of acceleration, determination of changes in direction, speed, and so forth, may be determined using the accelerometers. In addition, the sensors may include one or more gyroscopes to provide information indicative of rotation of an object affixed thereto. For example, the tote or other objects or devices may be equipped with a gyroscope to provide data indicative of a change in orientation. The sensors 312 may also include one or more magnetometers to determine a heading by measuring ambient magnetic fields, such as the terrestrial magnetic field. The magnetometers may be worn or carried by a user, mounted to a tote, and so forth. For example, the magnetometers worn by a user may act as a compass and provide information indicative of which way the user is facing.

The sensors 312 may also include one or more proximity sensors used to determine presence of an object, such as a user, a tote, and so forth. The proximity sensors may use optical, electrical, ultrasonic, electromagnetic, or other techniques to determine a presence of an object. In some implementations, the proximity sensors may use an optical emitter and an optical detector to determine proximity. For example, an optical emitter may emit light, a portion of which may then be reflected by the object back to the optical detector to provide an indication that the object is proximate to the proximity sensor. In other implementations, the proximity sensors may comprise a capacitive proximity sensor configured to provide an electrical field and determine a change in electrical capacitance due to presence or absence of an object within the electrical field.

The proximity sensors may be configured to provide sensor data indicative of one or more of a presence or absence of an object, a distance to the object, or characteristics of the object. An optical proximity sensor may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a camera. Based on an apparent distance between the features of the structured light pattern, the distance to the object may be calculated. Other techniques may also be used to determine distance to the object. In another example, the color of the reflected light may be used to characterize the object, such as skin, clothing, a tote, and so forth. In some implementations, a proximity sensor may be installed at the inventory area 304.

While a few sensors have been listed, the sensors 312 may include other sensors as well, such as ultrasonic rangefinders, thermometers, barometric sensors, hygrometers, or biometric input devices including, but not limited to, fingerprint readers or palm scanners.

The facility 300 may include one or more access points configured to establish one or more wireless networks. The access points may use Wi-Fi™, NFC, Bluetooth®, or other technologies to establish wireless communications between a device and a network coupling the facility to outside computing devices and entities. The wireless networks allow the devices to communicate with one or more of the inventory management system 310, the sensors 312, or other devices. In some implementations, a wired networking infrastructure may be implemented, as described below with reference to FIG. 4. For example, cabling may be used to provide Ethernet local area network connectivity between network switches, power injectors and endpoint devices (e.g., the sensors 312 and other computing devices).

Figure 4:
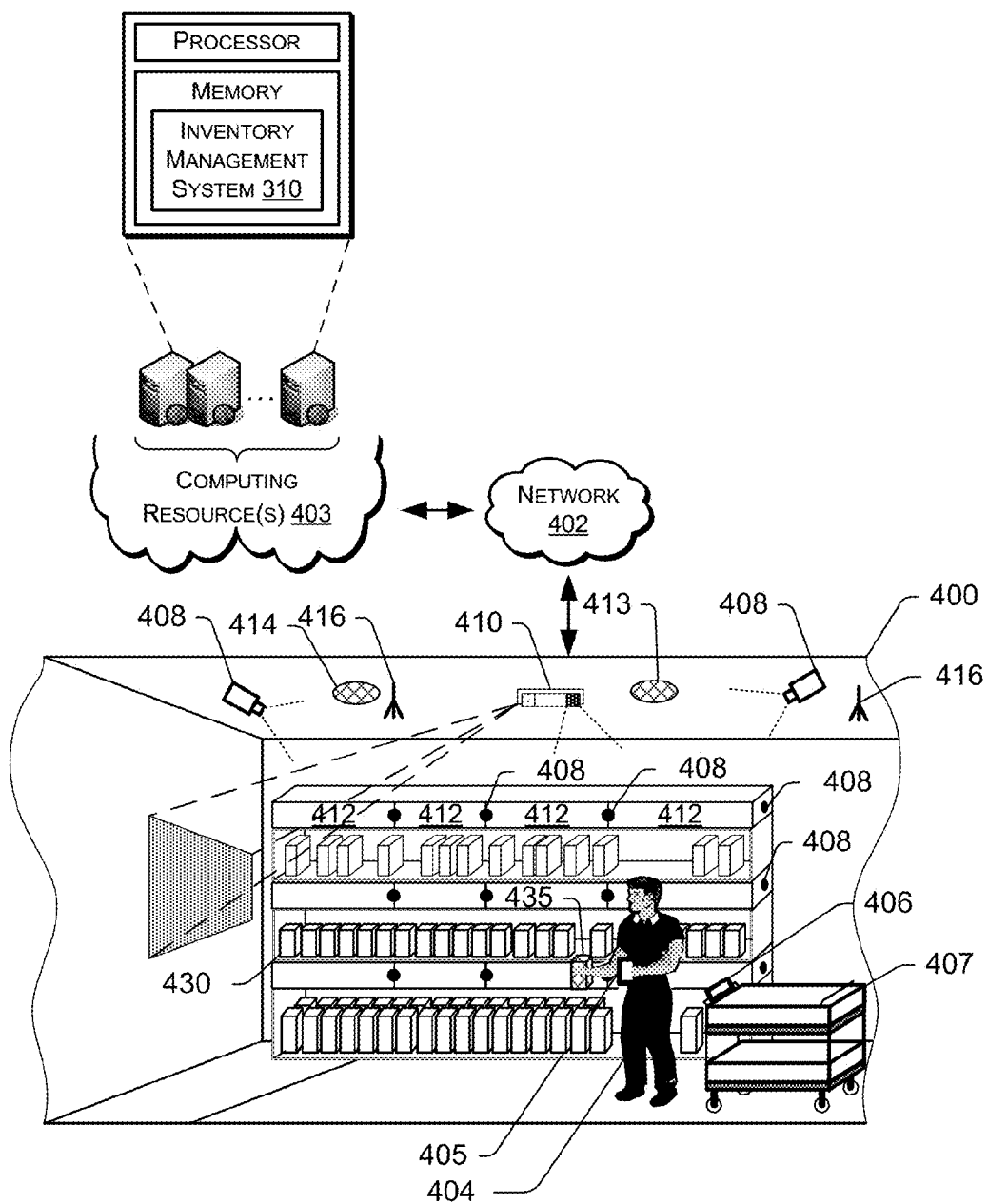
FIG. 4 shows additional components of the materials handling facility of FIG. 3.

FIG. 4 shows additional components of a materials handling facility 400, according to one implementation. Generally, the materials handling facility 400 may include one or more image capture devices, such as cameras 408. For example, one or more cameras 408 may be positioned in locations of the materials handling facility 400 so that images of locations, items, and/or users within the materials handling facility can be captured. In some implementations, the image capture devices 408 may be positioned overhead, such as on the ceiling, to capture images of users and/or locations within the materials handling facility. In addition, in some implementations, one or more cameras 408 may be positioned on or inside of inventory areas. For example, a series of cameras 408 may be positioned on external portions of the inventory areas and positioned to capture images of users and/or the location surrounding the inventory area. Likewise, one or more cameras 408 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, RFID readers, etc., may be utilized with the implementations described herein. For example, a pressure sensor and/or a scale may be used to detect when an item is added and/or removed from inventory areas. Likewise, a light curtain may be positioned to cover the front of an inventory area and detect when an object (e.g., a user's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or as an addition thereto, the inventory shelf may include one or more antenna elements coupled to an RFID reader that are configured to read RFID tags of items located on the inventory shelf. Further, a list of RFID tag identifiers received from RFID tags coupled to items on the inventory shelf may be maintained and used to poll the RFID tags and confirm that they have not been removed.

An RFID tag generally refers to a device with an antenna or resonator that can produce a wireless signal when activated or powered. The wireless signal produced by the RFID tag is typically low power, and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

When the user 404 arrives at the materials handling facility 400, one or more images of the user 404 may be captured and processed. For example, the images of the user 404 may be processed to identify the user 404. This may be done using a variety of techniques, such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, and the like.

The captured images and/or other inputs may also be used to establish a user pattern for the user 404 while located in the materials handling facility 400. The user pattern may identify an overall shape of the user 404 and/or any distinguishing features of the user 404 (e.g., color of shirt, height) that may be used to assist in the identification and/or tracking of the user 404 as they progress through the materials handling facility 400.

In some implementations, a user 404 located in the materials handling facility 400 may possess a portable device 405 and obtain information about items located within the materials handling facility 400, receive confirmation that the inventory management system 310 has correctly identified items that are picked and/or placed by the user, receive requests for confirmation regarding one or more event aspects, etc. Generally, the portable device 405 has at least a wireless module to facilitate communication with the inventory management system 310 and a display (e.g., a touch-based display) to facilitate visible presentation to and interaction with the user 404. The portable device 405 may store a unique identifier and provide that unique identifier to the inventory management system 310 and be used to identify the user 404. In some instances, the portable device 405 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 405 may operate in conjunction with or may otherwise utilize or communicate with one or more components of the inventory management system 310. Likewise, components of the inventory management system 310 may interact and communicate with the portable device 405 as well as identify the user 404, communicate with the user 404 via other means and/or communicate with other components of the inventory management system 310.

A tote 407 may also be associated with the user. The tote may be any form of apparatus configured to hold and/or carry items. For example, the tote 407 may be a bag, cart, trolley, etc. In some implementations, the tote 407 may include a device or display 406, which may be configured in a manner similar to the portable device 405. For example, the display 406 may include a touch-based display, a memory, processor, speakers, wireless network connectivity, etc. In other implementations, the tote 407 may include one or more embedded output devices. For example, the tote 407 may include illumination elements, speakers, actuators, etc., incorporated into the tote that may be activated using the implementations discussed herein.

As discussed further below, event information and/or user interfaces may be presented to the user via the portable device 405, the display 406, and/or any other output device located within the materials handling facility 400. Likewise, the portable device 405, the display 406 and/or any other input device located within the materials handling facility may be used to receive input from the user.

As discussed above, the inventory management system 310 may include one or more endpoint devices, such as imaging devices (e.g., cameras) 408, projectors 410, displays 412, speakers 413, microphones 414, computing devices, illumination elements (e.g., lights), etc., to facilitate communication between the inventory management system 310 and/or the user 404. In some implementations, multiple endpoint devices may be distributed within the materials handling facility 400. For example, there may be multiple imaging devices, such as cameras located on the ceilings and/or cameras (such as pico-cameras) located in the aisles near the inventory items.

The endpoint devices within the facility 400 may also include one or more communication devices, such as wireless antennas 416, that facilitate wireless communication (e.g., Wi-Fi, Near Field Communication (NFC), Bluetooth)

between the inventory management system 310 and the portable device 405. The inventory management system 310 may also include one or more computing resource(s) 403, such as a server system, that may be local to the environment (e.g., materials handling facility), remote from the environment, or any combination thereof.

The inventory management system 310 may utilize antennas 416 within the materials handling facility 400 to create a network 402 (e.g., Wi-Fi) so that the portable device 405 and/or display 406 can connect to and communicate with the inventory management system 310. Likewise, in instances when one or more of the components of the inventory management system 310 are remote from the materials handling facility 400, they may communicate with other components of the inventory management system 310 and/or the portable device 405 via the network 402. For example, when the user picks an item 435 from an inventory area 430, the inventory management system 310 may receive information, such as a load cell change, RFID tag identifier update, an image of the user, and/or an image of the performed action (item pick from the inventory area), identifying that an item has been picked from the inventory area 430. The event aspects (user identity, action performed, item involved in the event) may then be determined and the inventory management system 310 may send a user interface and/or information to the portable device 405 for presentation to the user 404.

FIG. 5 shows example endpoint devices and communication paths between endpoint-device types utilized in a materials handling facility. A portable device 505 may communicate and interact with various components of an inventory management system 310 over a variety of communication paths. Generally, endpoint devices of the inventory management system 310 may include input components 501, output components 511 and computing resource(s) 503. The input components 501 may include an imaging device 508, microphone 514, antenna 516, a RFID reader 527 with one or more antenna elements 528, or any other component that is capable of receiving input about the surrounding environment and/or from the user. The output components 511 may include a projector 510, a portable device 506, a display 512, an antenna 516, a radio (not shown), speakers 513, illumination elements 518 (e.g., lights), and/or any other component that is capable of providing output to the surrounding environment and/or the user.

The inventory management system 310 may also include computing resource(s) 503. The computing resource(s) 503 may be local to the environment (e.g., materials handling facility), remote from the environment, or any combination thereof. Likewise, the computing resource(s) 503 may be configured to communicate over a network 502 with input components 501, output components 511 and/or directly with the portable device 505, the user 504 and/or the tote 507.

As illustrated, the computing resource(s) 503 may be remote from the environment and implemented as one or more servers 503(1), 503(2), . . . , 503(P) and may, in some instances, form a portion of a network-accessible computing platform implemented as a computing infrastructure of processors, storage, software, data access, and so forth that is maintained and accessible by components/devices of the inventory management system 310 and/or the portable device 505 via a network 502, such as an intranet (e.g., local area network), the Internet, etc. The server system 503 may process images of users 504 to identify the user 504, process images of items to identify items, determine a location of items and/or determine a position of items. The server system(s) 503 does not require end-user knowledge of the physical location and configuration of the system that delivers the services. Common expressions associated for these remote computing resource(s) 503 include "on-demand computing," "software as a service (SaaS)," "platform computing," "network-accessible platform," "cloud services," "data centers," and so forth.

Each of the servers 503(1)-(P) include a processor 517 and memory 519, which may store or otherwise have access to an inventory management system 310, which may include or provide image processing (e.g., for user identification, expression identification, and/or item identification), inventory tracking, and/or location determination.

The network 502 may utilize wired technologies (e.g., wires, USB, fiber optic cable, etc.), wireless technologies (e.g., radio frequency, infrared, NFC, cellular, satellite, Bluetooth, etc.), or other connection technologies. The network 502 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 6:
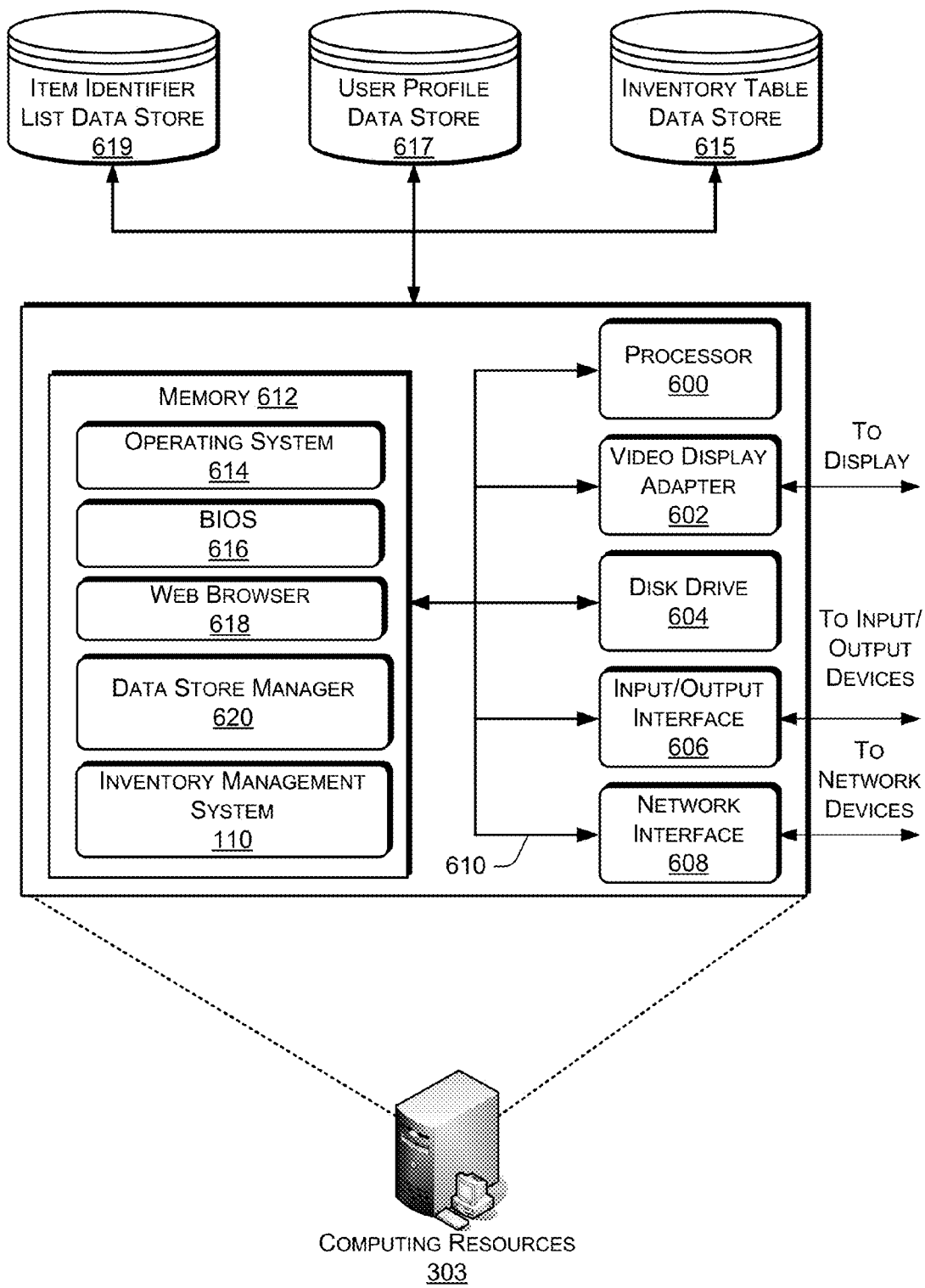
FIG. 6 is a block diagram of an illustrative implementation of computing resources that may be used with various implementations.

FIG. 6 is a pictorial diagram of an illustrative implementation of a server system, such as the computing resources 303, that may be used in the implementations described herein. The server system 303 may include a processor 600, such as one or more redundant processors, a video display adapter 602, a disk drive 604, an input/output interface 606, a network interface 608, and a memory 612. The processor 600, the video display adapter 602, the disk drive 604, the input/output interface 606, the network interface 608, and the memory 612 may be communicatively coupled to each other by a communication bus 610.

The video display adapter 602 provides display signals to a local display (not shown in FIG. 6) permitting an operator of the server system 303 to monitor and configure operation of the server system 303. The input/output interface 606 likewise communicates with external input/output devices not shown in FIG. 6, such as a mouse, keyboard, scanner, or other input and output devices that can be operated by an operator of the computing resources 303. The network interface 608 includes hardware, software, or any combination thereof, to communicate with other computing devices. For example, the network interface 608 may be configured to provide communications between the server system 303 and other computing devices via the network 302, as shown in FIG. 3.

The memory 612 generally comprises random access memory (RAM), read-only memory (ROM), flash memory, and/or other volatile or permanent memory. The memory 612 is shown storing an operating system 614 for controlling the operation of the server system 303. A binary input/output system (BIOS) 616 for controlling the low-level operation of the server system 303 is also stored in the memory 612.

The memory 612 additionally stores program code and data for providing network services that allow the inventory management system 310 to identify users and/or items within the materials handling facility. Accordingly, the memory 612 may store a browser application 618. The browser application 618 comprises computer executable instructions, that, when executed by the processor 600, generate or otherwise obtain configurable markup documents such as Web pages. The browser application 618 communicates with a data store manager application 620 to facilitate data exchange between the inventory table data store 615, the user profile data store 617 and/or the item identifier list data store 619.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 615-619 as needed to execute aspects of the inventory management system 310.

The data stores 615-619 can include several separate data tables, databases or other data storage mechanisms and media for storing data relating to a particular aspect. For example, the data stores 615-619 illustrated include mechanisms for maintaining inventory information (e.g., item locations, images of item when properly positioned, item features), user profile information, item lists associated with users, inventory tables associated with antenna elements and/or RFID readers, etc., which can be used to provide confirmations to a user that the inventory management system has properly identified an item and/or the action performed by the user.

It should be understood that there can be many other aspects that may be stored in the data stores 615-619. The data stores 615-619 are operable, through logic associated therewith, to receive instructions from the server system 303 and obtain, update or otherwise process data in response thereto.

The memory 612 may also include the inventory management system 310, discussed above. The inventory management system 310 may be executable by the processor 600 to implement one or more of the functions of the server system 303. In one implementation, the inventory management system 310 may represent instructions embodied in one or more software programs stored in the memory 612. In another implementation, the inventory management system 310 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction in FIG. 6 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a network switch;
   a power-over-Ethernet (POE) injector coupled to the network switch and to endpoint devices to pass data and current to each of the endpoint devices;
   a first endpoint device of the endpoint devices, the first endpoint device coupled to the POE injector to receive data and current from the POE injector over a first cable, the first endpoint device varying current drawn from the POE injector by the first endpoint device according to a first sequence;
   a second endpoint device of the endpoint devices, the second endpoint device coupled to the POE injector to receive data and current from the POE injector over a second cable, the second endpoint device varying current drawn from the POE injector by the second endpoint device according to a second sequence;
   memory storing data associating a first identifier with the first sequence and a second identifier with the second sequence; and
   a controller configured to:
      determine, using the data, the first identifier of the first endpoint device based at least in part on the first sequence;
      send, to the first endpoint device, a first instruction to at least one of power on or power off;
      determine, using the data, the second identifier of the second endpoint device based at least in part on second sequence; and
      send, to the second endpoint device, a second instruction to at least one of power on or power off.

2. A system as recited in claim 1, wherein the first endpoint device includes a MOSFET switch, and is configured to toggle the MOSFET switch between an open state and a closed state to vary the current drawn from the POE injector by the first endpoint device according to the first sequence.

3. A system as recited in claim 1, wherein the controller is further configured to send an instruction to the first endpoint device instructing the first endpoint device to vary current drawn from the POE injector by the first endpoint device.

4. A method comprising:
   storing first data that associates an identifier with a load-modulation sequence;
   receiving an indication of how an amount of current drawn by an endpoint device coupled to a power source has changed over time, the power source passing current and data to the endpoint device;
   determining, based at least in part on the first data and the indication, that how the amount of current drawn by the endpoint device coupled to the power source has changed over time corresponds to the load-modulation sequence; and
   storing, based at least in part on the determining, second data indicating that the endpoint device corresponds to the identifier.

5. A method as recited in claim 4, wherein:
   the power source couples a network switch to the endpoint device;
   the network switch couples to a controller; and
   the controller is configured to perform the determining.

6. A method as recited in claim 4, further comprising:
   receiving an additional indication of an amount of current drawn by an additional endpoint device coupled to the power source, the power source passing current and data to the additional endpoint device; and
   determining an identifier of the additional endpoint device based at least in part on the additional indication.

7. A method as recited in claim 4, further comprising storing an association between the identifier of the endpoint device and a particular port of the power source that couples the power source to the endpoint device.

8. A method as recited in claim 4, further comprising sending an instruction to the endpoint device instructing the endpoint device to modulate the amount of current drawn from the power source by the endpoint device according to a predefined sequence.

9. A method as recited in claim 4, wherein the endpoint device modulates the amount of current drawn from the power source as part of a start-up process of the endpoint device, and wherein the receiving of the indication comprises receiving the indication at least partly after the start-up process of the endpoint device.

10. A method as recited in claim 4, wherein:
the indication comprises a first indication;
the endpoint device comprises a first endpoint device;
the identifier comprises a first identifier;
the method further comprises:
   storing a first association between the first identifier of the endpoint device and a first port of the power source that couples the power source to the first endpoint device;
   receiving a second indication of an amount of current drawn by a second endpoint device coupled to the power source, the power source passing current and data to the second endpoint device;
   determining a second identifier of the second endpoint device based at least in part on the second indication; and
   storing a second association between the second identifier of the second endpoint device and a second port of the power source that couples the power source to the second endpoint device.

11. A method as recited in claim 4, wherein determining that how the amount of current drawn by the endpoint device coupled to the power source has changed over time corresponds to the load-modulation sequence comprises mapping an amount of current draw by the endpoint device over time to the load-modulation sequence.

12. A method as recited in claim 4, wherein:
the load-modulation sequence indicates a variance in an amount of current; and
the determining that how the amount of current drawn by the endpoint device coupled to the power source has changed over time corresponds to the load-modulation sequence comprises determining that the amount of current drawn by the endpoint device over time matches the variance in the amount of current as indicated by the load-modulation sequence.

13. A system comprising:
one or more processors; and
one or more non-transitory computer-readable media storing computer-executable instructions that, when executed, cause the one or more processors to perform acts comprising:
   receiving an indication of how a current drawn by an endpoint device has varied over time, the endpoint device coupled to a power source via a port of the power source, the power source configured to pass current to the endpoint device;
   determining an identifier of the endpoint device; and
   storing, based at least in determining the identifier of the endpoint device, an association between the identifier of the endpoint device and the port of the power source.

14. A system as recited in claim 13, wherein the indication of how the current drawn by the endpoint device has varied over time corresponds to a sequence that identifies one or more of a MAC address, IP address, or serial number of the endpoint device.

15. A system as recited in claim 13, wherein the power source couples a network switch to the endpoint device, the power source residing between the network switch and the endpoint device.

16. A system as recited in claim 13, the acts further comprising:
   receiving an indication of how a current drawn by an additional endpoint device has varied over time, the additional endpoint device coupled to the power source, the power source configured to pass current to the additional endpoint device; and
   determining an identifier of the additional endpoint device.

17. A system as recited in claim 13, the acts further comprising sending an instruction to the endpoint device instructing the endpoint device to modulate the current drawn from the power source by the endpoint device according to a predefined sequence.

18. A system as recited in claim 13, wherein:
the indication comprises a first indication;
the port comprises a first port;
the association comprises a first association;
the endpoint device comprises a first endpoint device;
the identifier comprises a first identifier; and
the acts further comprise:
   receiving a second indication of how a current drawn by a second endpoint device has varied over time, the second endpoint device coupled to the power source, the power source configured to pass current to the second endpoint device;
   determining a second identifier of the second endpoint device based at least in part on the second indication; and
   storing a second association between the second identifier of the second endpoint device and a second port of the power source that couples the power source to the second endpoint device.

19. A system as recited in claim 13, wherein the power source comprises a power-over-Ethernet (POE) injector configured to pass current and data to the endpoint device.

20. A system as recited in claim 13, the acts further comprising:
   storing data associating the identifier of the endpoint device with a sequence; and
   determining, using the indication, that the current drawn by the endpoint device corresponds to the sequence;
   and wherein the determining the identifier of the endpoint device comprises determining the identifier of the endpoint device based at least in part on determining that the current drawn by the endpoint device corresponds to the sequence.

* * * * *